US011982117B2

(12) United States Patent
Lanzl

(10) Patent No.: US 11,982,117 B2
(45) Date of Patent: May 14, 2024

(54) HINGE ASSEMBLY FOR A DOOR OF A REFRIGERATING COMPARTMENT

(71) Applicant: REHAU-BEHR A/S, Hadsten (DK)

(72) Inventor: Thomas Lanzl, Regensburg (DE)

(73) Assignee: REHAU-BEHR A/S, Hadsten (DK)

( * ) Notice: Subject to any disclaimer, the term of this patent is extended or adjusted under 35 U.S.C. 154(b) by 107 days.

(21) Appl. No.: 17/798,661

(22) PCT Filed: Feb. 11, 2021

(86) PCT No.: PCT/EP2021/053340
§ 371 (c)(1),
(2) Date: Aug. 10, 2022

(87) PCT Pub. No.: WO2021/160742
PCT Pub. Date: Aug. 19, 2021

(65) Prior Publication Data
US 2023/0091630 A1 Mar. 23, 2023

(30) Foreign Application Priority Data
Feb. 14, 2020 (DK) .......................... PA 2020 70086

(51) Int. Cl.

| | |
|---|---|
| ***E05D 7/06*** | (2006.01) |
| ***E05D 7/081*** | (2006.01) |
| ***E05D 11/08*** | (2006.01) |
| ***E05F 1/06*** | (2006.01) |
| ***E05F 3/14*** | (2006.01) |

(Continued)

(52) U.S. Cl.
CPC ............... *E05D 7/06* (2013.01); *E05D 7/081* (2013.01); *E05D 11/084* (2013.01); *E05F 1/063* (2013.01); *E05F 3/14* (2013.01); *E05F 3/20* (2013.01); *E05F 5/027* (2013.01); *F25D 23/02* (2013.01); *E05D 2011/085* (2013.01);
(Continued)

(58) Field of Classification Search
CPC ......... E05D 7/06; E05D 7/081; E05D 11/084; E05D 2011/085; E05D 2015/487; E05F 1/063; E05F 3/14; E05F 3/20; E05F 5/027; E05F 5/02
USPC .................................................... 16/378, 379
See application file for complete search history.

(56) References Cited

U.S. PATENT DOCUMENTS

| | | | |
|---|---|---|---|
| 1,518,220 | A | 12/1924 | Petrie |
| 2008/0127452 | A1 | 6/2008 | Jackson |

FOREIGN PATENT DOCUMENTS

| | | | |
|---|---|---|---|
| DE | 20 2017 103 403 | U | 8/2017 |
| EP | 2 803 799 | A2 | 11/2014 |

(Continued)

*Primary Examiner* — Jeffrey O'Brien
(74) *Attorney, Agent, or Firm* — Crowell & Moring LLP; John C. Freeman

(57) ABSTRACT

A hinge assembly for a door, the hinge assembly including a hinge pin arranged to be fixed to the door at one end and having a pin connector part at an opposite second end. A rotation damper connected to a damper connector part arranged to cooperate with the pin connector part for transferring torque around an axis of rotation between the damper connector part and the pin connector part throughout an opening angle of the door, such that a rotational movement of the damper connector part about the axis of rotation in at least a first rotational direction is dampened by the rotation damper. The pin connector part and the damper connection part allow an initial closing angle of rotation of the door before the damper acts on the rotation of the hinge pin, the initial closing angle being at least 2°.

14 Claims, 6 Drawing Sheets

(51) Int. Cl.

| | |
|---|---|
| ***E05F 3/20*** | (2006.01) |
| ***E05F 5/02*** | (2006.01) |
| ***F25D 23/02*** | (2006.01) |

(52) U.S. Cl.

CPC ..... *E05Y 2201/234* (2013.01); *E05Y 2201/24* (2013.01); *E05Y 2900/306* (2013.01); *E05Y 2900/31* (2013.01)

(56) References Cited

FOREIGN PATENT DOCUMENTS

| | | | |
|---|---|---|---|
| EP | 3 045 846 | A1 | 7/2016 |
| JP | H11-247522 | A | 9/1999 |
| JP | 2003-269038 | A | 9/2003 |
| KR | 2000 0051415 | A | 8/2000 |
| KR | 2000 0051589 | A | 8/2000 |
| KR | 2004 55413 | Y1 | 9/2011 |
| KR | 101 975 265 | B1 | 5/2019 |
| WO | WO 2008/050988 | A1 | 5/2008 |
| WO | WO 2014/142932 | A1 | 9/2014 |
| WO | WO 2016/185394 | A2 | 11/2016 |

HINGE ASSEMBLY FOR A DOOR OF A REFRIGERATING COMPARTMENT

This application is a national application based on Patent Cooperation Treaty Patent Application No. PCT/EP2021/053340, filed on Feb. 11, 2021, the entire contents of which are incorporated herein by reference.

This application claims under 35 U.S.C. § 119(a) the benefit of the filing date of Danish Patent Application No. PA202070086, filed on Feb. 14, 2020, the entire contents of which are incorporated herein by reference.

BACKGROUND OF THE INVENTION

Field of the Invention

The present invention relates to a hinge assembly suitable for a door of a refrigerating compartment, in particular a chiller cabinet.

Description of Related Art

Vertical doors of refrigerating compartment are often provided with means for ensuring that the door will be closed after it has been opened by e.g. a customer, mainly for saving of energy by preventing the warmer air from the surroundings to enter into the inner of the refrigerating compartment, which air also often has a higher absolute humidity, which may cause deposition of frozen water on the evaporator inside the refrigerating compartment. Different means has been applied to prevent a hard impact between the door and the frame of the refrigerating compartment, in particular when the door is forced towards the closed position.

It is an object of the present invention to provide an improved hinge assembly, with optimized means to prevent a hard impact between the door and the frame of the refrigerating compartment.

SUMMARY OF THE INVENTION

The present invention relates to a hinge assembly for a door arranged to facilitate opening and closing said door when attached to a refrigerating compartment, wherein the hinge assembly includes:

a hinge pin of a substantially elongated shape, arranged to be fixed to the door at one end and having a pin connector part at an opposite second end, wherein a first axis includes the longitudinal center-axis of the hinge pin, a rotation damper arranged to be fixed to a frame part of the refrigerating compartment, wherein the rotation damper is connected to a damper connector part arranged to cooperate with the pin connector part for transferring torque around a second axis of rotation between the damper connector part and the pin connector part throughout an opening angle of the door, such that a rotational movement of the damper connector part about the second axis of rotation in at least a first rotational direction is dampened by the rotation damper, wherein the pin connector part and the damper connection part are arranged to allow an initial closing angle of rotation of the door before the damper acts on the rotation of the hinge pin, the initial closing angle being at least 2°, such as in the range of 3° to 20°, more preferably in the range of 4° to 8°, and the initial closing angle being an angle of rotation of the door towards a closed position thereof immediately after an opening rotation of the door in the opposite direction of rotation.

By providing the connection between the door and the damper, i.e. the pin connector part and the damper connector part in a manner that allows a certain mutual closing rotation of the door before the damper will act on the rotation, a simple arrangement may be provided. One solution is exemplified below with reference to the drawings, another possible solution could include an elliptic connector part in an elliptic opening of larger dimensions and yet other solutions could be envisaged by the skilled person.

A preferred connection between the door and the damper is provided wherein one of the pin connector part and the damper connector part includes one or more protrusions extending radially in a direction perpendicular to a longitudinal center-axis of the connector part, and wherein the other of the pin connector part and the damper connector part includes one or more recesses in one or more walls thereon, wherein each protrusion is positioned within one of the recesses(s) during any axial movement and rotational movement of said hinge assembly, the protrusion(s) are arranged to engage with the wall(s) of the connector part upon rotational movement of the hinge pin such that the connector part is forced into a rotational movement about the second axis of rotation, and wherein the radial width of the protrusion(s), i.e., the extent of the protrusion(s) in the radial direction, is smaller than the radial width of the corresponding recesses(s), thereby allowing for the initial closing angle of the door. The difference in radial width of the protrusions and the recesses amount to a difference in angular extent of the protrusions and of the recesses, and that difference is equal to the initial closing angle of the door.

According to a further preferred embodiment of the hinge assembly the pin connector part is arranged with the damper connector part so as to allow a tilting of the hinge pin independently of the damper connector part without the tilting causing a torque between the pin connector part and the damper connector part, wherein the tilting may amount to an angle between the first axis of the hinge pin and the second axis of rotation of the damper connector part of at least 5°, preferably at least 8°.

In a particular embodiment, one of the pin connector part and the damper connection part includes one or more walls surrounding the other of the pin connector part and the damper connector part, wherein a tilting space is concentrically provided between the pin connector part and the damper connector part, wherein the tilting space allows for tilting of the hinge pin independent of the damper connector part.

It is further preferred that the hinge assembly includes a self-closing mechanism including a first sloping surface arranged to rotate with the door and a second sloping surface directed towards the first sloping surface and arranged to be stationary with respect to the refrigerating compartment, wherein the first and the second sloping surfaces are arranged to be in abutment such that a rotational movement of the door relative to refrigerating compartment provides an axial displacement of the door relatively to the refrigerating compartment in the vertical direction.

In particular, the first recesses(s) may be of a shape allowing at least axial movement of the one or more protrusions within the first recesses, provides a guiding slot in the connector part in which the one or more protrusions of the hinge pin can move, so that a rotational movement of the hinge pin in turn forces the connector part into a rotational movement about the second axis of rotation caused by an interaction between the protrusions and the one or more walls.

The present invention further relates to a refrigerating compartment comprising at least one door provided with a hinge assembly as disclosed herein.

BRIEF DESCRIPTION OF THE DRAWINGS

Aspects of the present disclosure are exemplified with reference made to the enclosed drawings of which.

DETAILED DESCRIPTION

Figure 1:
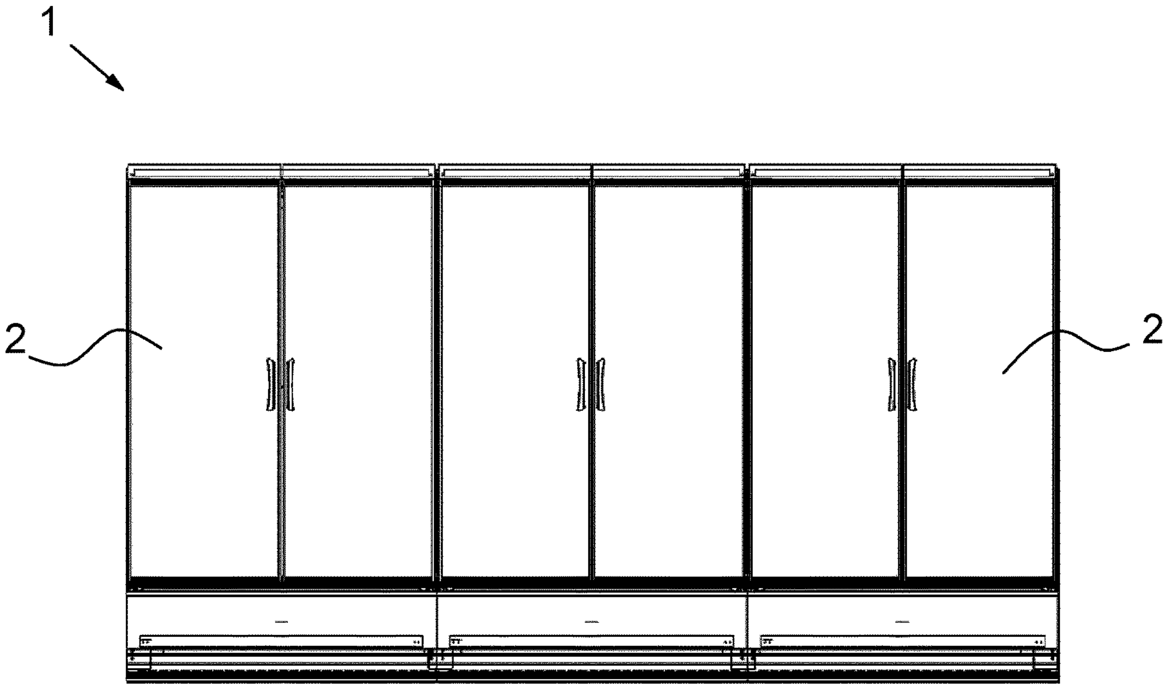
FIG. 1 shows a refrigerated furniture comprising a refrigerating compartment having a number of doors.
Figure 2:
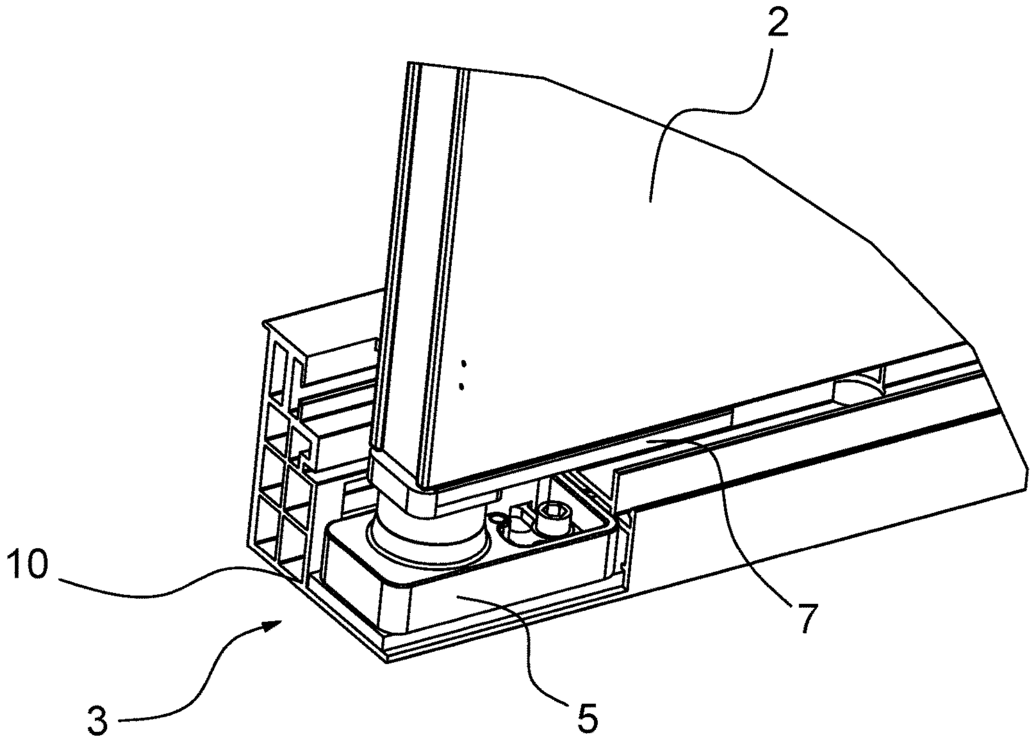
FIG. 2 shows a detail of the furniture of FIG. 1 with the lower part of a door and a hinge assembly.

The refrigerating compartment 1 shown in FIG. 1 has a plurality of vertical doors 2 for providing access to the interior of the compartment, where cooled or frozen goods can be stored and displayed for customers. At the bottom corner of the door 2 where it is connected to the frame part 10 of the refrigerating compartment 1 is arranged a hinge assembly 3 as shown in e.g. FIGS. 2 and 3.

Figure 3:
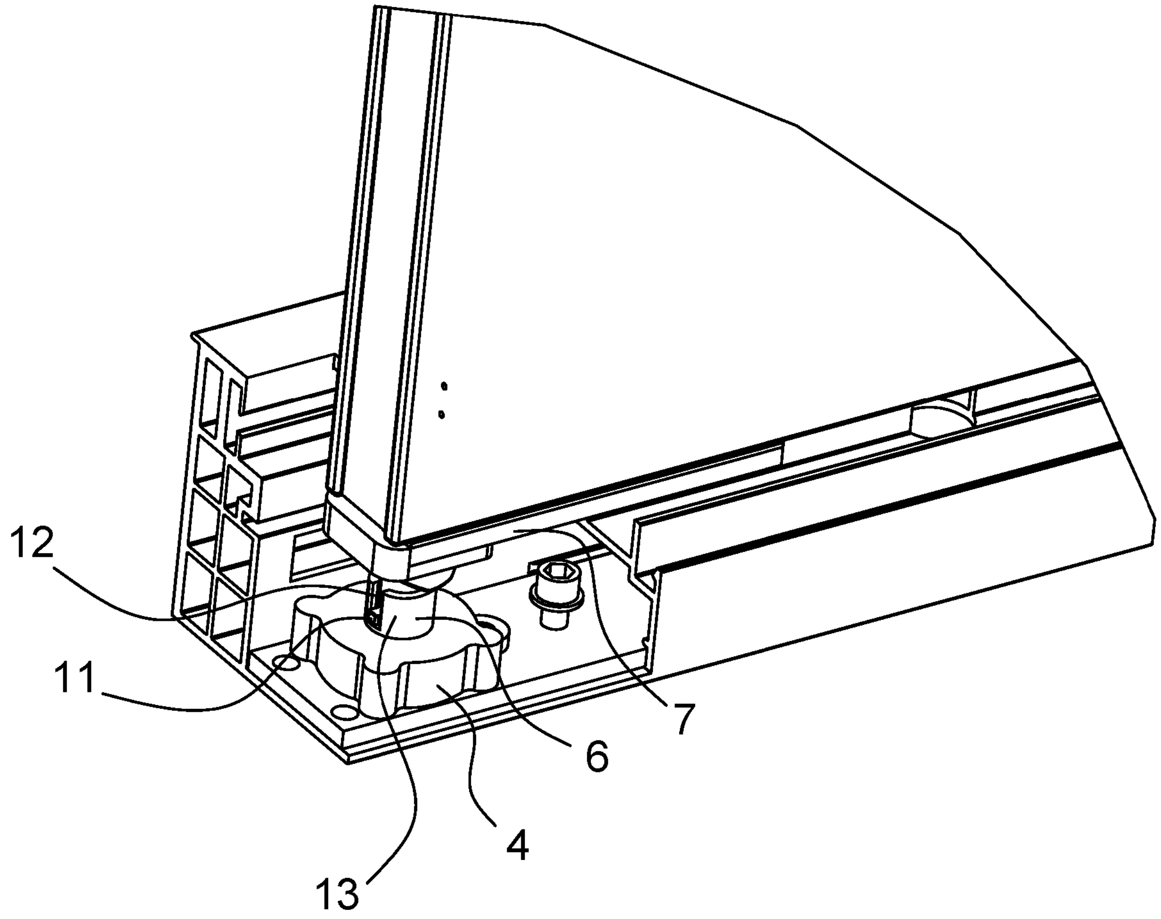
FIG. 3 shows hidden details of the view in FIG. 2.
Figure 4:
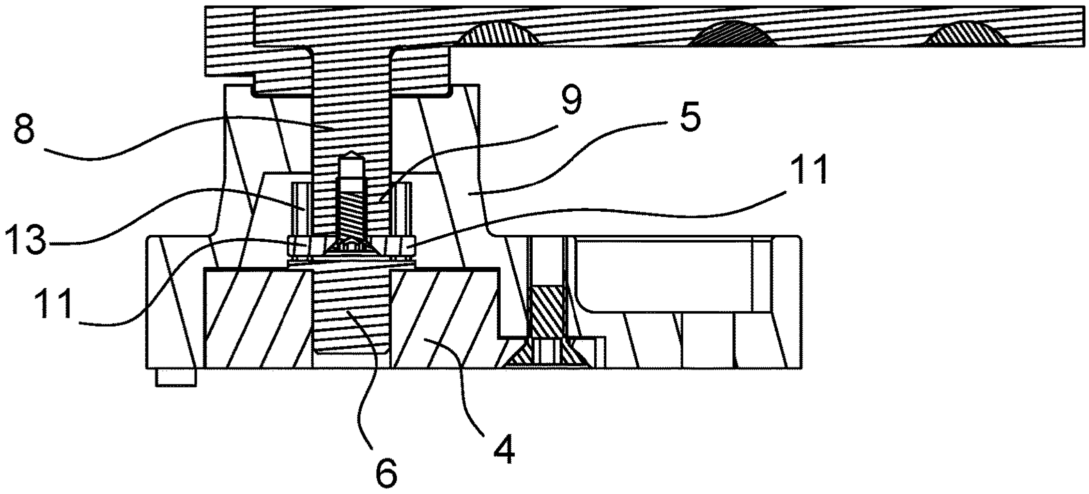
FIG. 4 shows a cross section of the hinge assembly.
Figure 5:
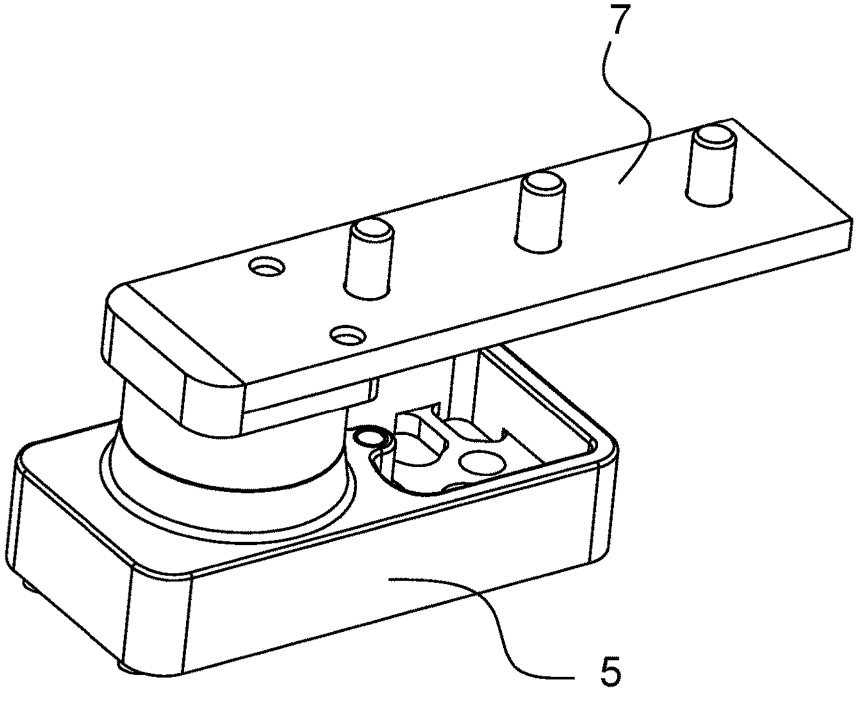
FIG. 5 shows a perspective view of the hinge assembly.

The hinge assembly 3 includes a stationary hinge part 5 mounted to the frame part 10 and enclosing a rotational damper 4, which is shown in FIG. 3, and a hinge-mounting bracket 7 for mounting at the lower edge of the door 2. A damper connection part 6 is provided to transfer a rotating motion from the hinge pin 8 fixed to the hinge-mounting bracket 7 to the damper 4 and to transfer torque between the hinge pin 8 and the damper 4.

The damper 4 is a one-way rotational damper, which is arranged for allowing undampened opening movement of the door 2 whereas the closing movement of the door 2 will, at least to a certain extent, be dampened by the damper 4.

Figure 6:
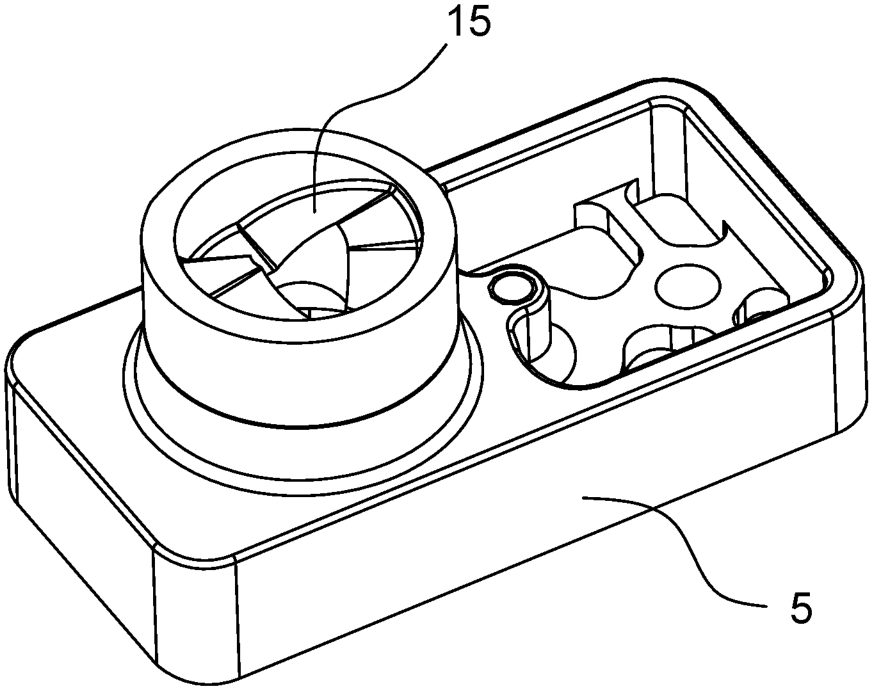
FIG. 6 shows a perspective view of the lower, stationary part of the hinge assembly.
Figure 7:
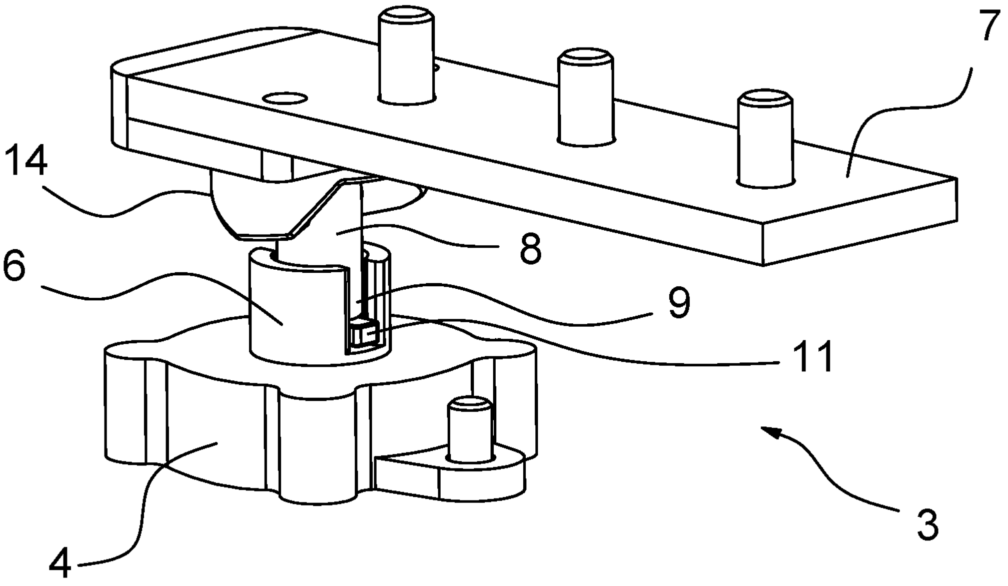
FIG. 7 shows a perspective view of hidden details of the hinge assembly.

The hinge assembly 3 is provided with a gravity-driven self-closing mechanism comprising a first sloping surface 14 arranged on the hinge mounting bracket 7 as shown in FIG. 7 which is arranged co cooperate with a second sloping surface 15 formed in the stationary hinge part 5 as shown in FIG. 6. The first and the second sloping surfaces 14, 15 are arranged to be in abutment such that a rotational movement of the door 2 relative to the refrigerating compartment 1 provides an axial displacement of the door 2 relatively to the refrigerating compartment 1. When the door 2 is opened by e.g. a customer, it is at the same time moved upwards by the interaction between the first sloping surface 14 and the second sloping surface 15 and when the customer releases the open door 2, the self-closing mechanism will make the door 2 turn back towards the closed position the due to the force of gravity on the door 2. Thus, during the opening and closing of the door 2, it will move in an axial direction with respect to the refrigerating compartment 1.

The pin connector part 9 is provided with two protrusions 11 extending radially from the pin connector part 9 into corresponding recesses 12 in a wall part 13 of the damper connection part 6, which recesses 12 extend in an axial direction of the damper connection part 9 so as to form guiding slots for the protrusions 11 when the hinge pin 8 is moved axially with respect to the damper 4 and the damper connection part 6 during rotational movement of the door 2.

Figure 8A:
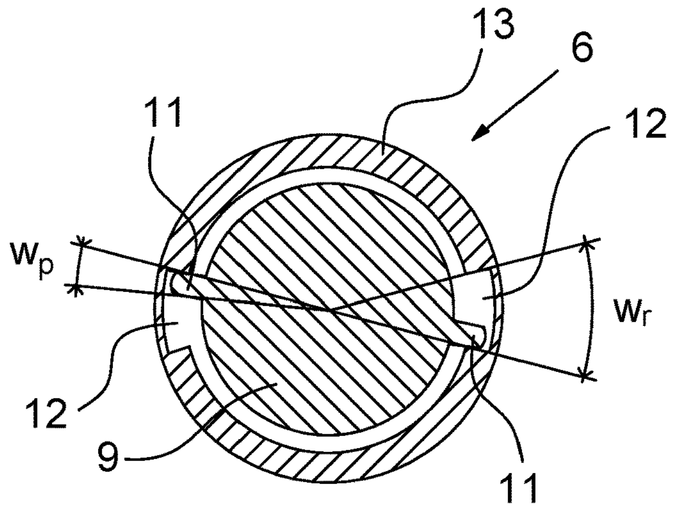
FIGS. 8*a*, 8*b*, and 8*c* show a horizontal cross-sectional view of the pin connector part and the damper connection part at various mutual positions during operation of the door.
Figure 8B:
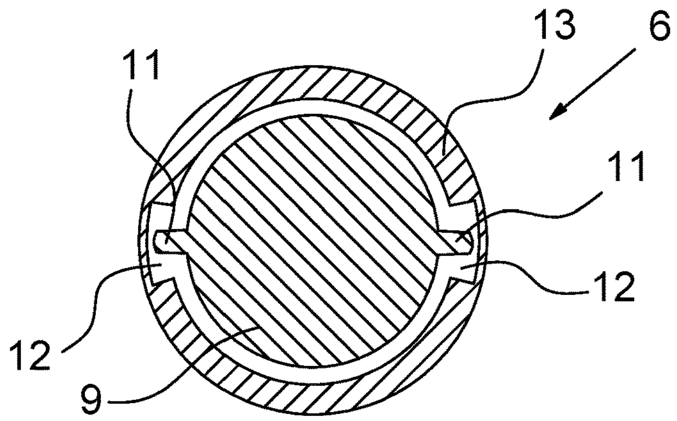
Figure 8C:
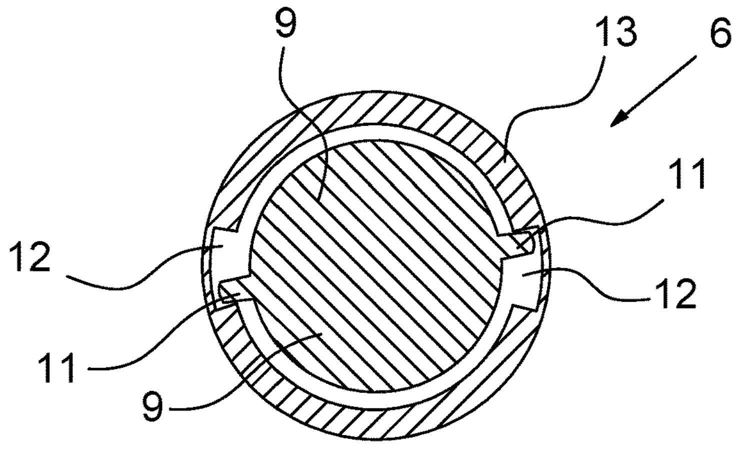
Figure 9:
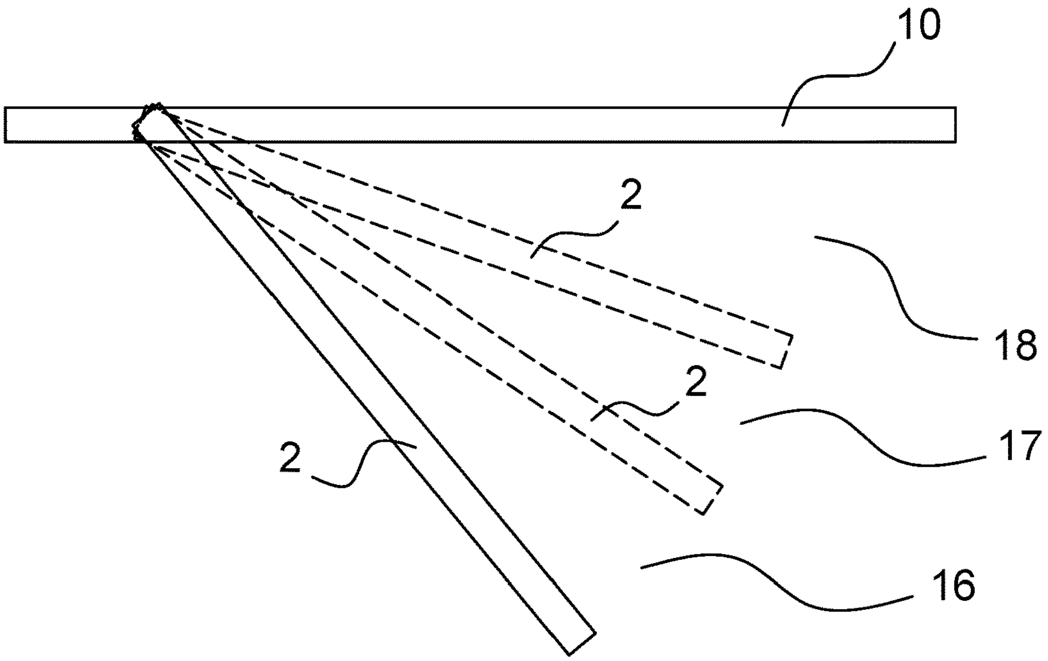
FIG. 9 shows the door at various positions during closing of the door.

The recesses 12 have a radial width Wr which is some degrees larger than the radial width Wp of the protrusions 11 which means that when the door 2 is being opened, the protrusions 11 are in abutment with one side of the recesses 12 as shown in FIG. 8*a*. When the door 2 is released in the opened position, the gravity-driven self-closing mechanism including the first and the second sloping surfaces 14, 15 will reverse the direction of rotation of the door 2 towards the closed position and the pin connector part 9 with the protrusions 11 will rotate within the recesses 12 at an angle equal to the difference between the radial width Wr of the recesses and the radial width Wp of the protrusions without also rotating the damper connection part 6 as shown in FIG. 8*b*. This angular difference Wr−Wp allows for an undampened acceleration of the rotational speed of the door 2 towards the closed position, and the angular difference may be at least 2°, such as 5° or 8°, where after the protrusions 11 come into abutting contact with the other side of the recesses 12 as shown in FIG. 8*c* and the rotation of the hinge pin 8 and the pin connector part 9 will rotate the damper connecter part 6 and the rotational damper 4 will start to dampen the rotational movement of the door 2 as shown in FIG. 9 until a constant rotational speed phase is reached which ends when the door 2 makes contact with the frame part 10 of the refrigerating compartment 1. The advantage of having the angular difference Wr−Wp which is the angle through which the door will accelerate undampened is that the door 2 will close faster than it would if the damper was acting on the rotation of the door 2 from the very beginning of the closing movement of the door 2 and that the period the door 2 will remain open thereby is shortened. Thus, less hot air will enter the compartment 1 and the energy consumption of the refrigerating compartment 1 is reduced.

FIG. 9 shows the various stages of the closing movement of the door 2 as seen from above, the first stage 16 being the undampened acceleration of the door 2, the second stage 17 being the dampened movement where the damper 4 adjusts the closing speed of the door 2 to the third stage 18 where the closing speed of the door 2 is constant until the door 2 makes contact with the frame 10 of the refrigerating compartment 1 and the movements stops.

Figure 10:
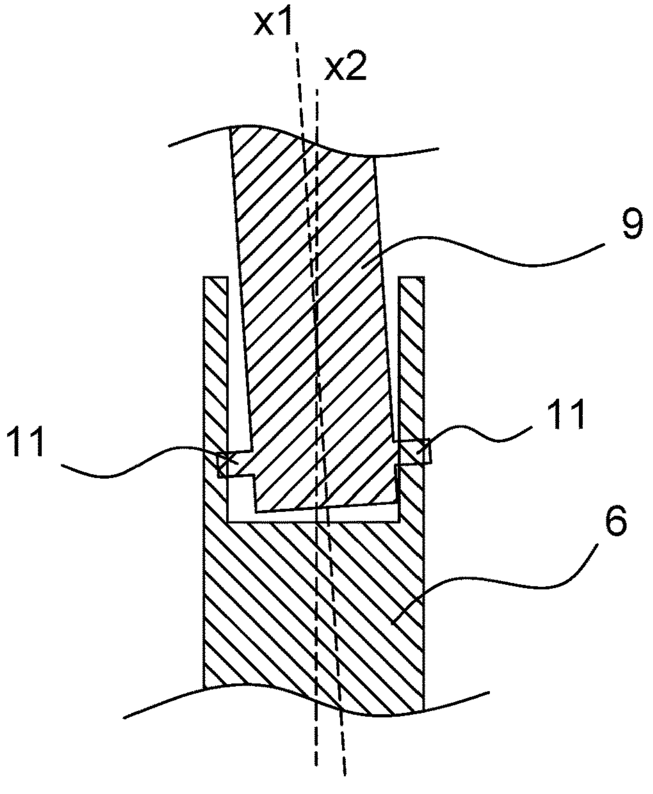
FIG. 10 illustrates the pin connection part tilted with respect to the damper connection part.

The outer diameter of the pin connector part 9 is less than the inner diameter of the wall part 13 of damper connection part 6 to allow a tilting of the hinge pin 8 independently of the damper connector part 6 as shown in FIG. 10. Due to the mass of the glass door 2, which typically is made with at least two parallel glass panes is and quite heavy, the door 2 will be prone to sag, which means that the axis of rotation of the door 2 will have a tendency to be tilting with respect to the frame part 10 of the refrigerating compartment 1, where the damper 4 and damper connection part 6 are oriented about a second axis X2 of rotation. With the present construction, it is achieved that a possible tilting of the hinge pin 8 will not cause a torque to be transferred between the pin connector part 9 and the damper connector part 6. Said tilting may amount to an angle between the axis X1 of the hinge pin 8 and the second axis of rotation X2 of the damper connector part 6 of at least 5°, preferably at least 8°.

LIST OF REFERENCE NUMERALS

1 Refrigerating compartment
2 Door of refrigerated compartment
3 Hinge assembly
4 Damper
5 Stationary hinge part
6 Damper connection part
7 Hinge mounting bracket
8 Hinge pin
9 Pin connector part
10 Frame part of refrigerating compartment
11 Protrusions on pin connector part
12 Recess
13 Wall part of damper connection part
14 First sloping surface
15 Second sloping surface
16 Acceleration stage of door closing
17 Adjustment stage of door closing
18 Constant speed stage of door closing
Wp Angular extent of protrusion
Wr Angular extent of recesses
X1 First axis
X2 Second axis of rotation

The invention claimed is:

1. A hinge assembly for a door arranged to facilitate opening and closing the door when attached to a refrigerating compartment, wherein the hinge assembly comprises:

a hinge pin of a substantially elongated shape, arranged to be fixed to the door at one end and having a pin connector part at an opposite second end, wherein a first axis comprises a longitudinal center-axis of the hinge pin;

a rotation damper arranged to be fixed to a frame part of the refrigerating compartment, wherein the rotation damper is connected to a damper connector part arranged to cooperate with the pin connector part for transferring torque around a second axis of rotation between the damper connector part and the pin connector part throughout an opening angle of the door, such that a rotational movement of the damper connector part about the second axis of rotation in at least a first rotational direction is dampened by the rotation damper;

wherein the pin connector part and the damper connection part are arranged to allow an initial closing angle of rotation of the door before the rotation damper acts on the rotation of the hinge pin, the initial closing angle being at least 2°, and the initial closing angle being an angle of rotation of the door towards a closed position thereof immediately after an opening rotation of the door in an opposite direction of rotation;

wherein the pin connector part is arranged with the damper connector part so as to allow a tilting of the hinge pin independently of the damper connector part without the tilting causing a torque between the pin connector part and the damper connector part, wherein the tilting allows an angle between the first axis of the hinge pin and the second axis of rotation of the damper connector part of at least 5°.

2. The hinge assembly according to claim 1, wherein one of the pin connector part and the damper connector part comprises one or more protrusions extending radially in a direction perpendicular to a longitudinal center-axis of the one of the pin connector part and the damper connector part, and wherein the other of the pin connector part and the damper connector part comprises one or more recesses in one or more walls thereon, wherein each of the one or more protrusions is positioned within one of the one or more recesses during any axial movement and rotational movement of the hinge assembly, the one or more protrusions are arranged to engage with the one or more walls of the other of the pin connector part and the damper connector part upon rotational movement of the hinge pin such that the one of the pin connector part and the damper connector part is forced into a rotational movement about the second axis of rotation, and wherein a radial width of the one or more protrusions is smaller than a radial width of the corresponding one or more recesses, thereby allowing for the initial closing angle of rotation of the door.

3. The hinge assembly according to claim 1, wherein one of the pin connector part and the damper connection part comprises one or more walls surrounding the other of the pin connector part and the damper connector part, wherein a tilting space is concentrically provided between the pin connector part and the damper connector part, wherein the tilting space allows for tilting of the hinge pin independent of the damper connector part.

4. The hinge assembly according to claim 1, further comprising a self-closing mechanism comprising a first sloping surface arranged to rotate with the door and a second sloping surface directed towards the first sloping surface and arranged to be stationary with respect to the refrigerating compartment, wherein the first sloping surface and the second sloping surface are arranged to be in abutment such that a rotational movement of the door relative to the refrigerating compartment provides an axial displacement of the door relative to the refrigerating compartment in a vertical direction.

5. The hinge assembly according to claim 2, wherein the one or more recesses are of a shape allowing at least axial movement of the one or more protrusions within the one or more recesses, provides a guiding slot in the damper connector part in which the one or more protrusions of the pin connector part is configured to move, so that a rotational movement of the hinge pin in turn forces the damper connector part into a rotational movement about the second axis of rotation caused by an interaction between the one or more protrusions and the one or more walls.

6. The hinge assembly according to claim 1, wherein the initial closing angle is in the range of 3° to 20°.

7. The hinge assembly according to claim 1, wherein the initial closing angle is in the range of 4° to 8°.

8. A refrigerating compartment comprising:

a frame part;

at least one door connected with the frame part, wherein the at least one door is provided with a hinge assembly comprising:

a hinge pin of a substantially elongated shape, arranged to be fixed to the door at one end and having a pin connector part at an opposite second end, wherein a first axis comprises a longitudinal center-axis of the hinge pin;

a rotation damper arranged to be fixed to the frame part of the refrigerating compartment, wherein the rotation damper is connected to a damper connector part arranged to cooperate with the pin connector part for transferring torque around a second axis of rotation between the damper connector part and the pin connector part throughout an opening angle of the door, such that a rotational movement of the damper connector part about the second axis of rotation in at least a first rotational direction is dampened by the rotation damper;

wherein the pin connector part and the damper connection part are arranged to allow an initial closing angle of rotation of the door before the rotation damper acts on the rotation of the hinge pin, the initial closing angle being at least 2°, and the initial closing angle being an angle of rotation of the door towards a closed position thereof immediately after an opening rotation of the door in an opposite direction of rotation;

wherein the pin connector part is arranged with the damper connector part so as to allow a tilting of the hinge pin independently of the damper connector part without the tilting causing a torque between the pin connector part and the damper connector part, wherein the tilting allows an angle between the first axis of the hinge pin and the second axis of rotation of the damper connector part of at least 5°.

9. The refrigerating compartment according to claim 8, wherein one of the pin connector part and the damper connector part comprises one or more protrusions extending radially in a direction perpendicular to a longitudinal center-axis of the one of the pin connector part and the damper connector part, and wherein the other of the pin connector part and the damper connector part comprises one or more recesses in one or more walls thereon, wherein each of the one or more protrusions is positioned within one of the one or more recesses during any axial movement and rotational movement of the hinge assembly, the one or more protrusions are arranged to engage with the one or more walls of the other of the pin connector part and the damper connector part upon rotational movement of the hinge pin such that the one of the pin connector part and the damper connector part is forced into a rotational movement about the second axis of rotation, and wherein a radial width of the one or more protrusions is smaller than a radial width of the corresponding one or more recesses, thereby allowing for the initial closing angle of rotation of the door.

10. The refrigerating compartment according to claim 8, wherein one of the pin connector part and the damper connection part comprises one or more walls surrounding the other of the pin connector part and the damper connector part, wherein a tilting space is concentrically provided between the pin connector part and the damper connector part, wherein the tilting space allows for tilting of the hinge pin independent of the damper connector part.

11. The refrigerating compartment according to claim 8, further comprising a self-closing mechanism comprising a first sloping surface arranged to rotate with the door and a second sloping surface directed towards the first sloping surface and arranged to be stationary with respect to the refrigerating compartment, wherein the first sloping surface and the second sloping surface are arranged to be in abutment such that a rotational movement of the door relative to the refrigerating compartment provides an axial displacement of the door relative to the refrigerating compartment in a vertical direction.

12. The refrigerating compartment according to claim 9, wherein the one or more recesses are of a shape allowing at least axial movement of the one or more protrusions within the one or more recesses, provides a guiding slot in the damper connector part in which the one or more protrusions of the pin connector part is configured to move, so that a rotational movement of the hinge pin in turn forces the damper connector part into a rotational movement about the second axis of rotation caused by an interaction between the one or more protrusions and the one or more walls.

13. The refrigerating compartment according to claim 8, wherein the initial closing angle is in the range of 3° to 20°.

14. The refrigerating compartment according to claim 8, wherein the initial closing angle is in the range of 4° to 8°.

* * * * *